US008489796B2

(12) United States Patent
Blanton et al.

(10) Patent No.: US 8,489,796 B2
(45) Date of Patent: Jul. 16, 2013

(54) WIRELESS PROTOCOL ADAPTER ASSEMBLY WITH INTERCHANGEABLE CONNECTORS

(75) Inventors: Robin Blanton, Grosse Ile, MI (US); Roger Leon Van Elslander, Warren, MI (US); David Such, Greenwood, IN (US)

(73) Assignee: Dearborn Group, Inc., Farmington Hills, MI (US)

( * ) Notice: Subject to any disclaimer, the term of this patent is extended or adjusted under 35 U.S.C. 154(b) by 799 days.

(21) Appl. No.: 12/460,399

(22) Filed: Jul. 17, 2009

(65) Prior Publication Data

US 2010/0121986 A1  May 13, 2010

Related U.S. Application Data

(60) Provisional application No. 61/135,280, filed on Jul. 18, 2008.

(51) Int. Cl.
*G06F 13/36* (2006.01)
(52) U.S. Cl.
USPC .............................. 710/315; 709/250; 701/29
(58) Field of Classification Search
USPC ....................................................... 709/250
See application file for complete search history.

(56) References Cited

U.S. PATENT DOCUMENTS

| 2002/0004694 A1* | 1/2002 | Mcleod et al. | 701/29 |
| 2005/0038921 A1* | 2/2005 | McClure et al. | 710/1 |
| 2006/0217855 A1* | 9/2006 | Chinnadurai et al. | 701/29 |
| 2007/0124528 A1* | 5/2007 | Blanton et al. | 710/315 |
| 2007/0233340 A1* | 10/2007 | Raichle et al. | 701/29 |
| 2008/0215360 A1* | 9/2008 | Dicks et al. | 705/2 |

* cited by examiner

*Primary Examiner* — Firmin Backer
*Assistant Examiner* — Natisha Cox
(74) *Attorney, Agent, or Firm* — Warn Partners, P.C.

(57) ABSTRACT

The present invention relates to a wireless protocol adapter assembly for diagnostics, analysis, and monitoring. The wireless protocol adapter assembly provides a common connection interface between a sealed common electronics package and a plurality of vehicle connectors that access a plurality of vehicle networks respectively for translating and transferring signals between the plurality of in-vehicle networks and a host computer. The common connection interface allows the vehicle connector compatible with a particular vehicle type to be coupled to the common electronics package. The common electronics package can recognizes when it is connected to a vehicle network running a particular protocol and automatically switch to that protocol. A wireless protocol adapter board having a standard connection pinning arrangement allows wireless links to be changed or altered as wireless standards change and evolve.

19 Claims, 5 Drawing Sheets

WIRELESS PROTOCOL ADAPTER ASSEMBLY WITH INTERCHANGEABLE CONNECTORS

CROSS-REFERENCE TO RELATED APPLICATIONS

This application claims the benefit of U.S. Provisional Patent Application No. 61/135,280, filed Jul. 18, 2008, the contents of which are incorporated by reference in their entirety.

GOVERNMENT RIGHTS

This invention was made with Government support under contract reference number W31 P4Q-05-A-0031 entered into by and between the U.S. Department of Defense and the prime contractor, SAIC, to which Applicant is a subcontractor. The Government has certain rights in the invention.

FIELD OF THE INVENTION

The present invention relates to a protocol adapter assembly for monitoring of a plurality of in-vehicle networks, in particular, to a wireless protocol adapter assembly including an interchangeable vehicle connector interface.

BACKGROUND OF THE INVENTION

Vehicles employ various networks and systems for diagnostics, analysis, and monitoring of vehicle systems. These various networks are generally selectively connectable to an external host computer so that the operation of the vehicle networks and systems can be monitored by an external system outside of the vehicle. These various vehicle systems and networks operate under different protocols, such as the J1708 and J1939 protocols. Protocol adapters allow the external host computer to communicate and otherwise interface with the plurality of vehicle networks through the protocols.

Protocol adapters can include circuitry for performing functions wirelessly and generally include a connection portion for accessing vehicle networks and an electronics portion for translating and transferring the signals. There are many different styles of vehicle connectors in use on automobiles, trucks, and the like, which give access to various network data lines in the vehicle. Typically, the connection portion, which varies relative to the vehicle networks of the vehicle type under test, is manually connected to the vehicle's networks so that the protocol adapter can transmit signals between the vehicle's networks and the host computer. Since the configuration and interface of the connection portions can vary widely depending on the type of vehicle, e.g., truck, automobile, bus, agricultural, construction equipment, and the like, this necessitates the need for the availability and use of a multitude of connection portions and corresponding compatible electronics portions to support all of a plurality of vehicle types. Such inflexibility in protocol adapter compatibility and interchangeability between a variety of vehicles is costly, time consuming, inefficient, and burdensome.

Accordingly, there exists a need for a wireless protocol adapter assembly which can allow for various vehicle connectors to be selectively coupled to a common electronics package by a common connection platform to provide an efficient and cost effective interchangeable connection interface. In addition, since wireless communication standards rapidly change and evolve, there exists a need for a wireless protocol adapter assembly with a wireless adapter board that is interchangeable for changing protocols without necessitating a new and redesigned wireless protocol adapter assembly.

SUMMARY OF THE INVENTION

The present invention is directed to a wireless protocol adapter assembly comprised of a common connection platform or interface for providing selective coupling of a variety of vehicle connectors to a common electronics package for transferring signals between in-vehicle networks and an external host computer. This common connection interface allows the vehicle connector compatible with a particular vehicle type, e.g., a truck, bus, automobile, construction equipment, and the like vehicle type, to be coupled to the common electronics package. Thus, the common connection interface allows the wireless protocol adapter assembly to be adapted for use on a variety of vehicles. The common electronics package is compatible with all targeted vehicle types, therefore there is no need to stock the same number of common electronics packages as the multitude of vehicle connectors. In addition, since the common electronics package is a separate piece from the vehicle connector assemblies, damage to one does not necessitate the need to repair or replace the other.

The common electronics package includes an environment resistant protective casing to encase the electronics in a sealed unit and has at least one manual reset switch input feature formed on the outside of the common electronics package.

The wireless protocol adapter assembly is part of a vehicle diagnostic and communication system that includes vehicle networks for vehicles under test, software to recognize and communicate in various protocols, and an external host computer. The wireless protocol adapter assembly can translate and transmit signals between the vehicle networks in a vehicle under test and the external host computer and includes a wireless adapter board that is operably connectable to a microcontroller, such as a microcontroller printed circuit board (PCB), for processing signals. In addition, the wireless adapter board includes a standard connection pinning arrangement for connecting to the microcontroller PCB in order to accommodate current and future wireless standards, e.g., Bluetooth, Zigbee (802.15.4), WiFi (802.11 et al.) and the like. As wireless communication standards change and evolve, the standard connection pinning arrangement of the wireless adapter board allows the microcontroller PCB assembly to be mated with a plurality of wireless adapters or protocols for changing protocols or wireless links without necessitating a new and redesigned wireless protocol adapter assembly. The wireless protocol adapter assembly can also recognize when it is connected to a vehicle network running a particular protocol, e.g., J1708, J1587, J1939, CAN, GM UART, ALDL, J1850 protocol and the like, and automatically switch to that protocol. Accordingly, all vehicle protocols can be supported and a plurality of in-vehicle network protocols may be active at the same time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
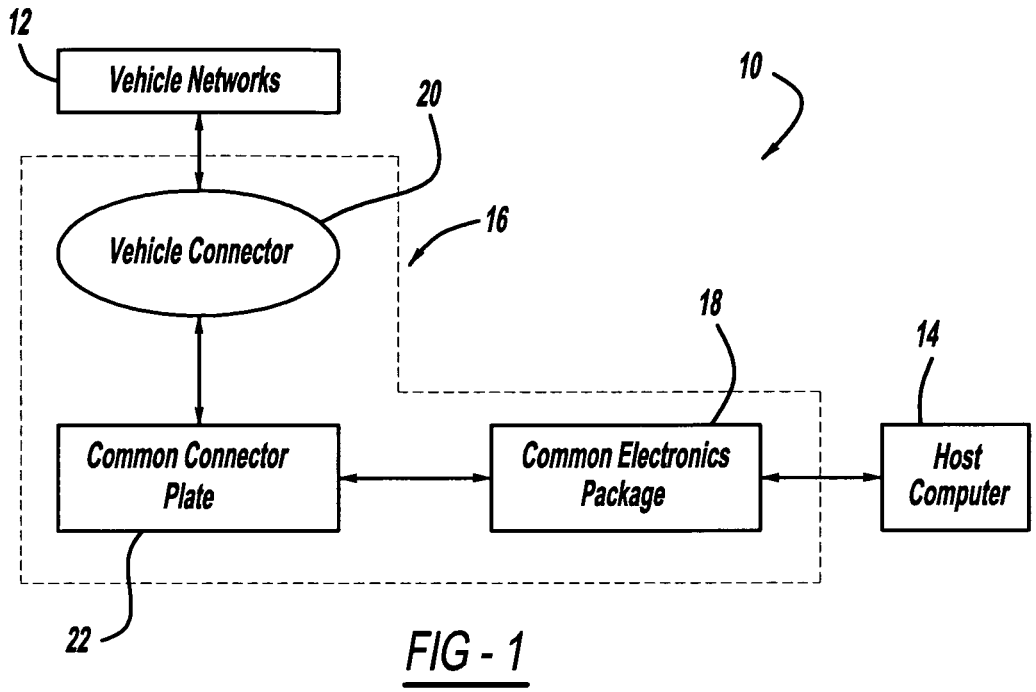
FIG. 1 is a schematic diagram that depicts a wireless vehicle diagnostic and communication system for diagnostic communication using a wireless protocol adapter assembling, in accordance with the present invention.

FIG. 1 is a schematic diagram of a wireless vehicle diagnostics system, shown generally at 10, for transferring diagnostic signals between vehicle networks 12 in a vehicle to an externally located host computer 14 utilizing a wireless protocol adapter assembly, generally shown at 16. The wireless protocol adapter assembly 16 includes a common electronics package 18 coupled to a vehicle connector 20 using a common connector plate 22. The common electronics package 18 can be selectively mated to a plurality of vehicle connectors 20 using the common connector plate 22. The modular design with common electronics package 18 allows efficient switching between these various vehicle connectors 20, e.g., between various analog and digital vehicle connectors 20. The wireless protocol adapter assembly 16 translates and transmits signals between the host computer 14 and a plurality of vehicle networks 12, e.g., for diagnostic communication, diagnosing and evaluating function and problems of transmissions, engines, electrical components, and the like.

The wireless protocol adapter assembly 16 is operably connectable to interface wirelessly with the host computer 14 which can transmit a request for data to be collected by the wireless protocol adapter assembly 16. The wireless protocol adapter assembly 16 collects the requested data from the vehicle networks 12 and can translate the data into a predetermined format before transmitting the data to the host computer 14. The received data can also be processed by software in operable association with the host computer 14. The wireless protocol adapter assembly 16 can support all vehicle network protocols, e.g., J1708, J1587, J1939, CAN, GM UART, ALDL, J1850, and the like plurality of different protocols, for diagnostic, analysis, data retrieval, and maintenance monitoring of any vehicle network 12 within a plurality of vehicle types, e.g., truck, automobile, bus, agricultural, construction equipment, and the like vehicle types. It is understood that the host computer 14 can be any host computer 14 that supports such monitoring wirelessly and alternatively by a hardwire connection. It is further understood that the software can format any data to be transmitted by the host computer 14 to be compatible with the plurality of vehicle networks 12, and that the wireless protocol adapter assembly 16 can also perform any necessary network communication algorithm to transfer data between the host computer 14 and vehicle networks 12.

Figure 2:
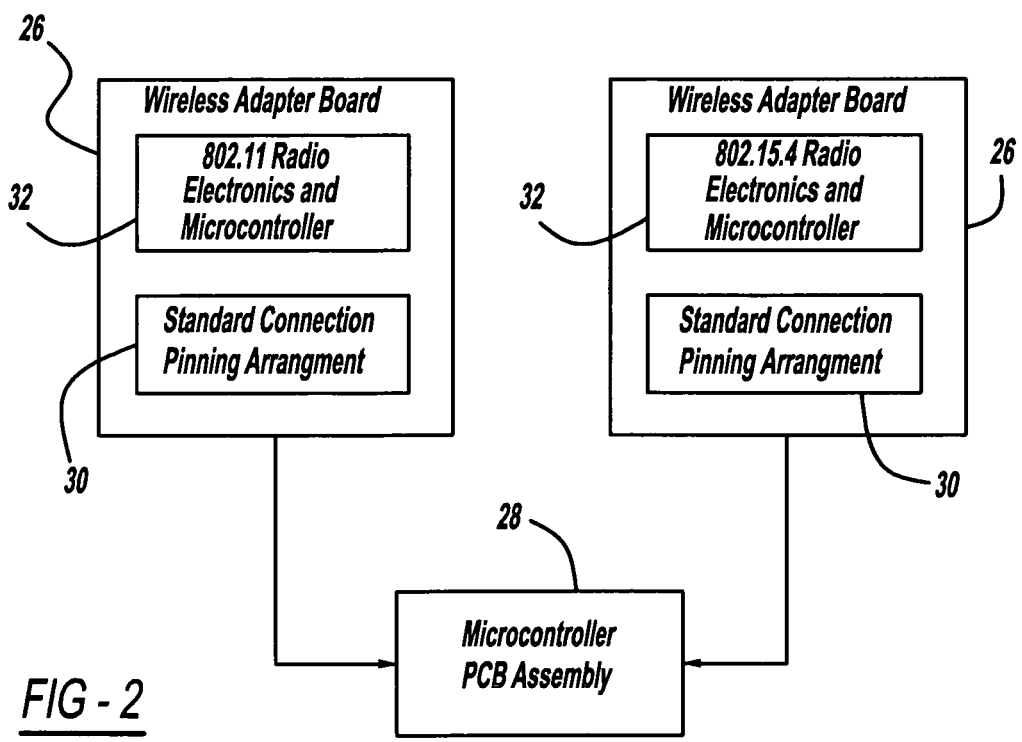
FIG. 2 is a schematic diagram that depicts two alternative wireless adapter boards coupled to a Microcontroller PCB Assembly, in accordance with the present invention.

Referring to the schematic diagram of FIG. 2, the wireless protocol adapter assembly 16 includes a wireless adapter board 26 operably associated with the common electronics package 18. The wireless adapter board 26 is operably coupled to a microprocessor, e.g., a microcontroller (PCB) assembly 28, and includes any of a plurality of wireless adapters 32 and a standard connection pinning arrangement 30 for establishing a standard connection between the wireless adapter board 26 and the microcontroller PCB assembly 28. The wireless adapter board 26 allows the microcontroller PCB assembly 28 to be selectively mated with a plurality of wireless adapters or wireless protocols 32, e.g., a plurality of different protocols such as to Bluetooth, 802.15.4, Zigbee, 802.11, IEEE 802.15.1, IEEE 802.11a, IEEE 802.11b, IEEE 802.11g, WiFi 802.11, and the like. The microcontroller PCB assembly 28 can be adapted to receive and format signals to the proper format in order for signals to be transmitted between the host computer 14 and the plurality of vehicle networks 12. Since wireless communication industry standards rapidly evolve and change, the interchangeability of the wireless adapter board 26 in the wireless protocol adapter system 16 allows wireless links to be easily changed or altered without necessitating a new and redesigned wireless protocol adapter assembly 16. Iterations of the wireless adapter board 26 can follow the standard connection pinning arrangement 30 and placement to assure that, as wireless standards change and evolve, the wireless adapter board 26 fits into the wireless protocol adapter assembly 16 form factor and is correctly connected to the microcontroller PCB 28. The wireless adapter board 26 can be operably disposed at least partly within the common electronics package 18, the common connector plate 22, or alternatively operably coupled to an outside surface of the common electronics package 18.

Referring to FIGS. 3(a)-6 generally, the common connector plate 22 is operably coupled to a vehicle connector 20 to form a vehicle connector assembly, shown generally as 24, which is selectively coupled to the common electronics package 18. The common connection interface allows the vehicle connector 20 compatible with a particular vehicle type, e.g., a truck, bus, automobile, construction equipment, and the like, to be coupled to the common electronics package 18. The vehicle connector 20 is also operably connectable to the vehicle network 12 of the particular vehicle under test. The vehicle connector assembly 24 and common electronics package 18 are thereby in electrical and data communication with one another. By way of non-limiting example, the common connector plate 22 of the vehicle connector assembly 24 can adapt vehicle connector 20 signals to the common electronics package 18 through pads on a circuit board, e.g., the wireless adapter board 26. It is understood that the common connector plate 22 can be releasably or permanently connected to the common electronics package 18.

The vehicle connectors 20 can be analog and digital connectors, e.g., 9-pin Deutsch (shown in FIGS. 3(a)-3(b), 5, and 8) connectors, 6-pin Deutsch, 4-pin Haldex, GM UART 6-pin, ALDL 12-pin (shown in FIGS. 6-7), analog connectors by ISAS, DMM/TK connectors, and the like. The common electronics package 18 allows efficient switching between these various analog and digital vehicle connectors 20. The common electronics package 18 can determine which vehicle connector 20 is coupled to the common electronics package 18 by the common connector plate 22 and enable communication with the appropriate in-vehicle network. Thus, the common electronics package 18 can help process or translate and transfer signals between the plurality of in-vehicle networks and the host computer 14 for the plurality of different protocols.

The common electronics package 18 of the wireless protocol adapter assembly 16 has a protective outer casing 34 to protect the common electronics package 18 from debris and environmental damage, including preventing the ingress of water, salt, sand, fuel, snow, vehicle fluids, dust, humidity, and the like fluid materials, into the sealed common electronics package 18. One side of the outer casing 34 includes a visual indicator panel 36. An opposing second side includes an attachment portion 38 for attaching the common connector plate 22 to the common electronics package 18 so that the common connection interface allows the vehicle connector 20 compatible with a particular vehicle type to be coupled to the common electronics package 18.

Figure 3A:
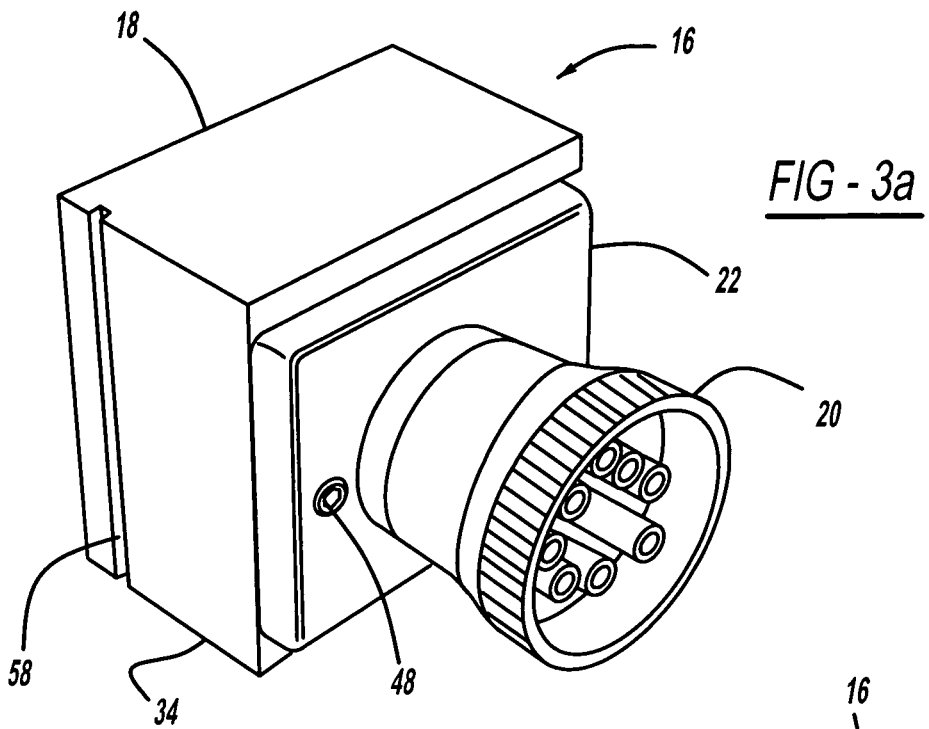
FIG. 3a is a perspective view of a wireless protocol adapter assembly, in accordance with an embodiment of the present invention.
Figure 3B:
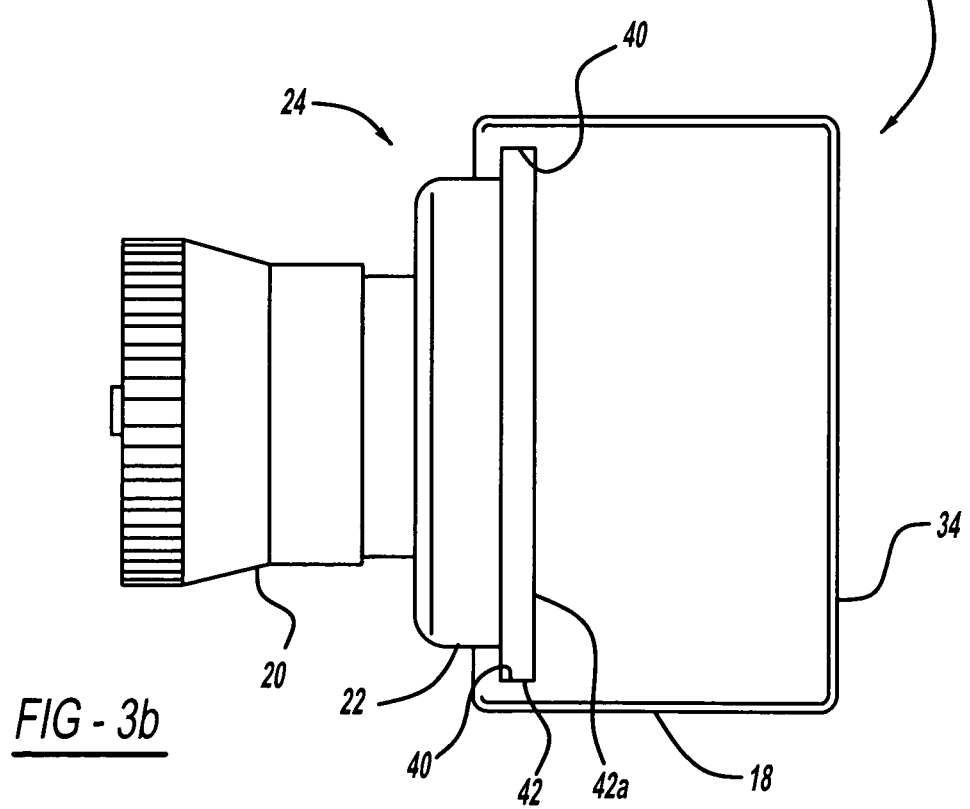
FIG. 3b is a side view of the wireless protocol adapter assembly shown in FIG. 3a, in accordance with the present invention.
Figure 4A:
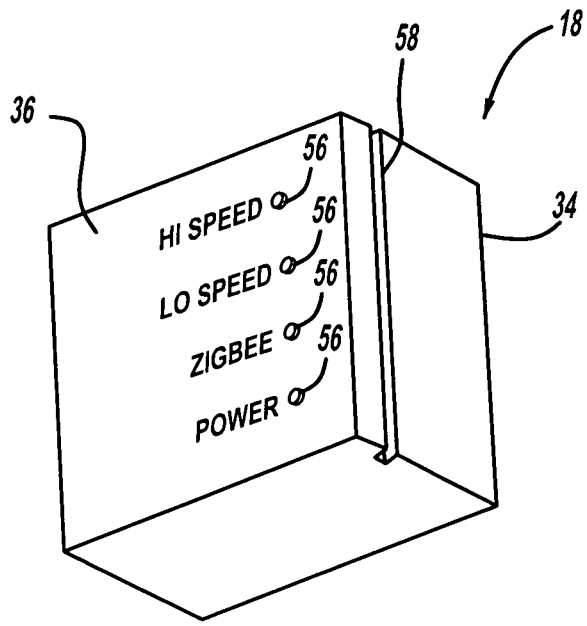
FIG. 4a is a perspective view of a common electronics package, in accordance with the present invention.
Figure 4B:
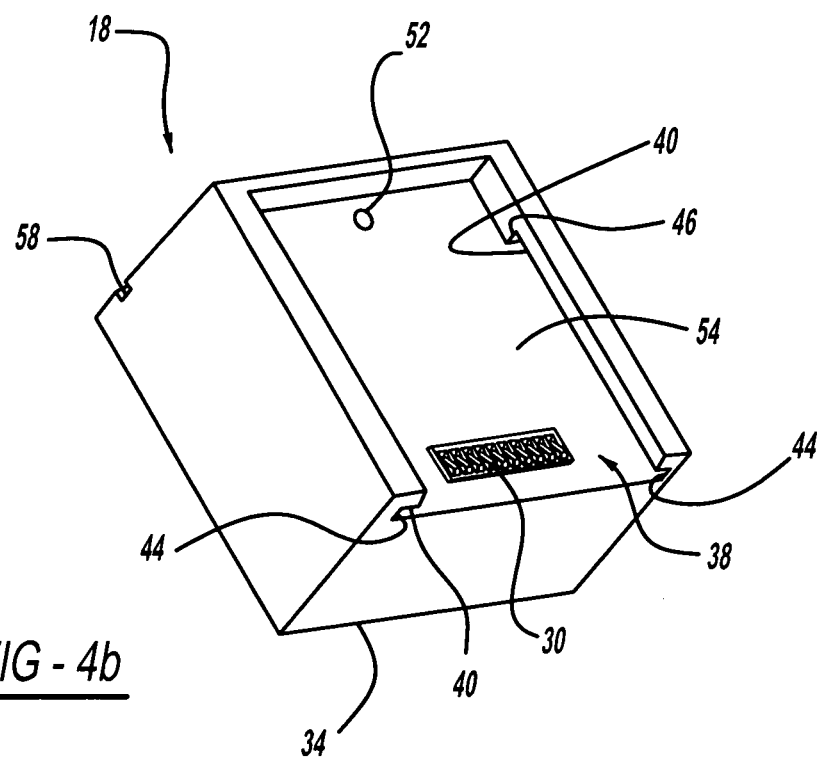
FIG. 4b is a rear perspective view of the common electronics package shown in FIG. 4a, in accordance with the present invention.
Figure 5:
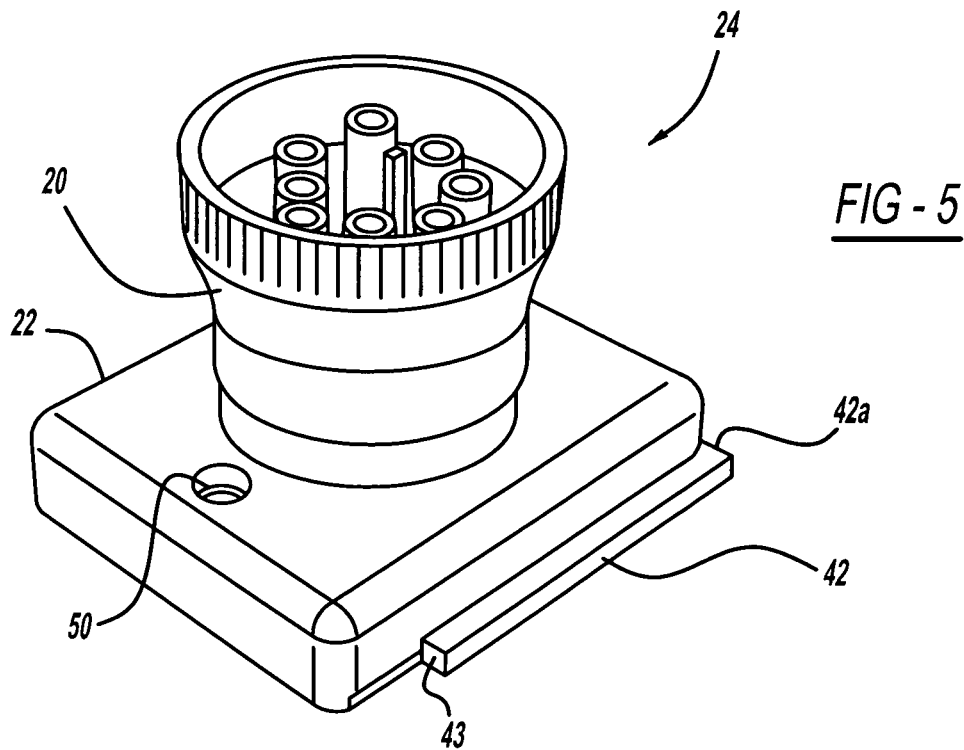
FIG. 5 is a perspective view of a vehicle connector assembly, in accordance with the present invention.

Referring to FIGS. 3b, 4b and 5 generally, the attachment portion 38 can include at least one engagement channel 40 or any alternative shape or keyed configuration adapted for preventing incorrect connection orientation of the common connector plate 22 to the common electronics package 18, e.g., to allow the common connector plate 22 to be coupled to the engagement channel 40 only in a predetermined orientation. The engagement channel 40 can be formed in the outer casing 34 of the common electronics package 18 and is configured and adapted to engage at least one opposing feature, e.g., a flange 42 shown in FIGS. 3, 5, and 7, of the vehicle connector assembly 24. The flange 42 area can protrude from at least one vertical side of the common connector plate 22 to slidably engage each respective engagement channel 40. Each engagement channel 40 has an open end 44 for slidably receiving the respective flange 42. The engagement channel 40 can extend some distance to a stop 46 formed in the engagement channel 40 to contact an end 43 of the flange to prevent incorrect orientation of the common connector plate 22 within the attachment portion 38. The flange 42 can additionally have an end potion 42a that protrudes from a vertical side of the common connector plate 22 toward the bottom such that the end portion 42a is generally perpendicular to the at least one engagement channel 40 and the flange 42 within the engagement channel 42. FIG. 4b illustrates two engagement channels 40 sized to each slidably receive opposing flanges 42 located toward the bottom of the common connector plate 22 until the end 43 of each flange 42 contacts the respective stop 46. The end portion 42a of the flange 42 is perpendicular to the engagement channels 40 and adjacent to both open ends 44. When the common connector plate 22 is installed within the attachment portion 38, e.g., in the predetermined orientation such that the end 43 and stop 46 are in contact with one another, the flanges 42 are held within the engagement channels 40. The common connector plate 22 can be held in place by friction and at least one fastening element 48, e.g., bolt, screw, a recessed hexagonal socket hole in an allen bolt, and the like. A first aperture 50 can be formed through the common connector plate 22 and a second aperture 52 can be formed in a substantially planar surface 54 of the attachment portion 38 to line up and receive the fastening element 48. When the common connector plate 22 is coupled to the attachment portion 38, the common connector plate 22 is adjacent to and substantially covers the planar surface 54. The planar surface 54 can form part of the engagement channel 40, e.g., to form a generally u-shaped channel for receiving and holding the flange 42.

While the common electronics package 18 is illustrated as being substantially square, it is understood that the common electronics package 18 can alternatively be circular, cylindrical, oblong, rectangular and the like. It is further understood that the outer casing 34 can be formed as a one piece or two piece outer casing 34. It is additionally understood that the engagement channels 40 or slot can be any alternative shape that allows for only correct connection orientation of the common connector plate 22.

Referring to the figures generally, and specifically to FIG. 4, the visual indicator panel 36 of the common electronics package 18 can include a plurality of light emitting diodes (LEDs) 56. At least one LED can be bi-colored or dual-colored. Signals transmitted or received by the wireless protocol adapter assembly 16 selectively activate at least one LED 56 so that the user of the wireless protocol adapter assembly 16 is aware of the test conditions. By way of non-limiting example, the host computer 14 can transmit the signal to the wireless protocol adapter assembly 16 and the appropriate LED 56 can be illuminated or sound can be made in order to signal that a connection has been made, the test is complete, and for something of the like where it would be beneficial for the host computer 14 to communicate with the wireless protocol adapter assembly 16. Another example is that the wireless protocol adapter assembly 16 can also transmit the signal to the host computer 14 which will activate the appropriate LED 56 in order to make the user aware of the signal transmission. It is understood that alternative displays can be used, e.g., LCD screens and the like. It is understood that alternatively a plurality of dual-colored LEDs can be used to visually indicate which of the plurality of different protocols is being used by the in-vehicle networks and said host computer.

The common electronics package 18 also includes at least one slot 58 that is a manual switch input feature or coin switch. The slot 58 is formed on at least one surface of the common electronics package 18, e.g., on the outer casing 34. The slot 58 includes a pair of metal conductor contacts located on adjacent opposing sides of the slot. The switch mechanism functions by manually sliding a thin metal object, e.g., a coin or knife blade, through the slot 58. As the metal object is slid through the slot 58, it comes in contact with the pair of metal contacts at the same time to complete the electrical connection between the contacts. The electrical connection creates a reset switch signal input and a general purpose input to the common electronics package 18 without requiring the use of actual mechanical switches and without having to open the common electronics package 18. It is understood that the at least one slot 58 can be disposed on any alternative operable side of the common electronics package 18.

Figure 6:
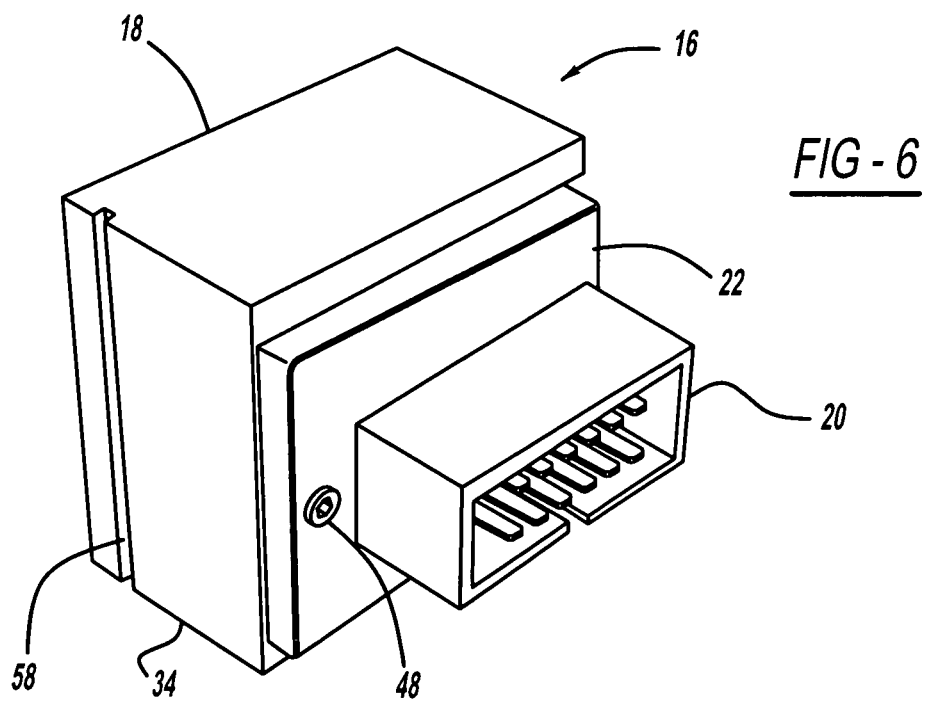
FIG. 6 is a perspective view of the wireless protocol adapter assembly, in accordance with the present invention.

Referring to FIGS. 3(a)-3(b) and 6, the vehicle connector 20 can generally extend away from the common connector plate 22 in a direction parallel to an axis extending from the common electronics package 18 to the vehicle connector 20 for coupling to a plurality of in-vehicle networks.

Figure 7:
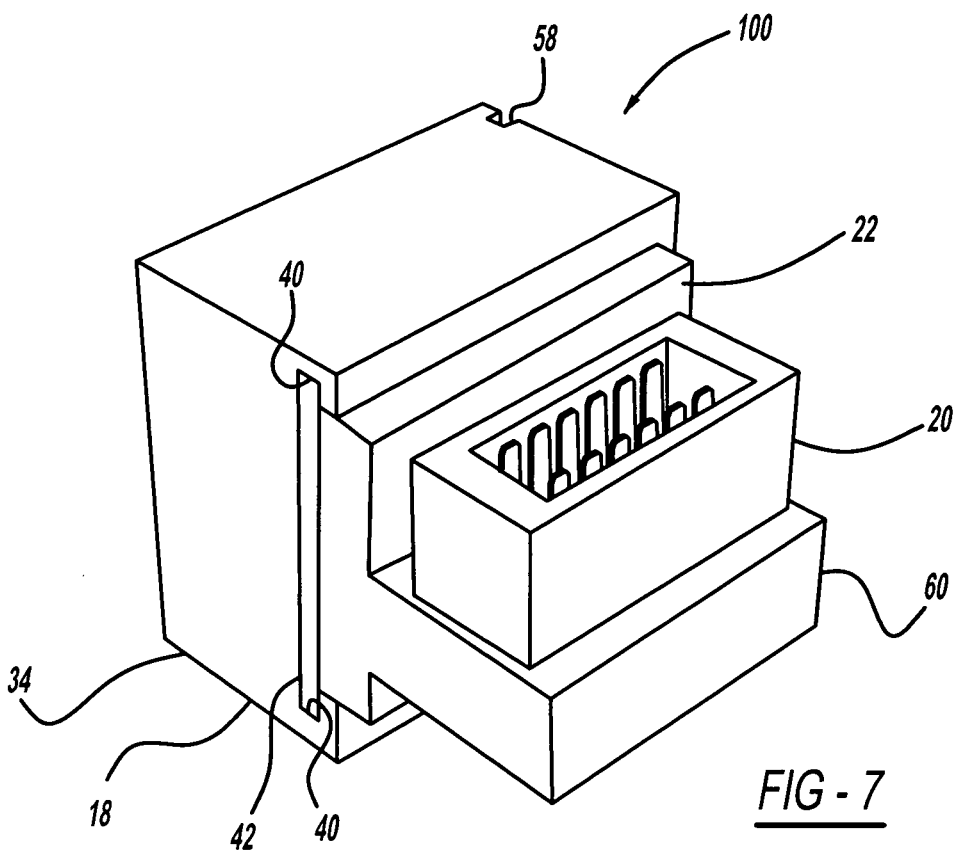
FIG. 7 is a perspective view of a wireless protocol adapter assembly, in accordance with another embodiment of the present invention.

Referring to FIG. 7, an additional embodiment of a wireless protocol adapter assembly of the present invention, shown generally as 100, the common connector plate 22 includes an extension portion 60 that is integrally formed with and projects from the common connector plate 22. In this embodiment, the vehicle connector 20, e.g., ALDL 12-pin, is operably coupled to the extension portion 60. The vehicle connector 20 can be substantially perpendicular to the axis extending from the common electronics package 18 to the vehicle connector 20 operable for coupling to a plurality of in-vehicle networks. The configuration of the extension portion 60 thereby allows the angle of the vehicle connectors to vary for coupling to a plurality of in-vehicle networks. FIG. 7 illustrates the vehicle connector 20 coupled to the top of the extension portion 60 and extending in an upwardly facing vertical direction. It is understood that the vehicle connector 20 can alternatively be coupled to an opposing side of the extension portion 60, e.g., such that the vehicle connector 20 extends in a downwardly facing vertical direction operable for coupling to a plurality of in-vehicle networks.

Figure 8:
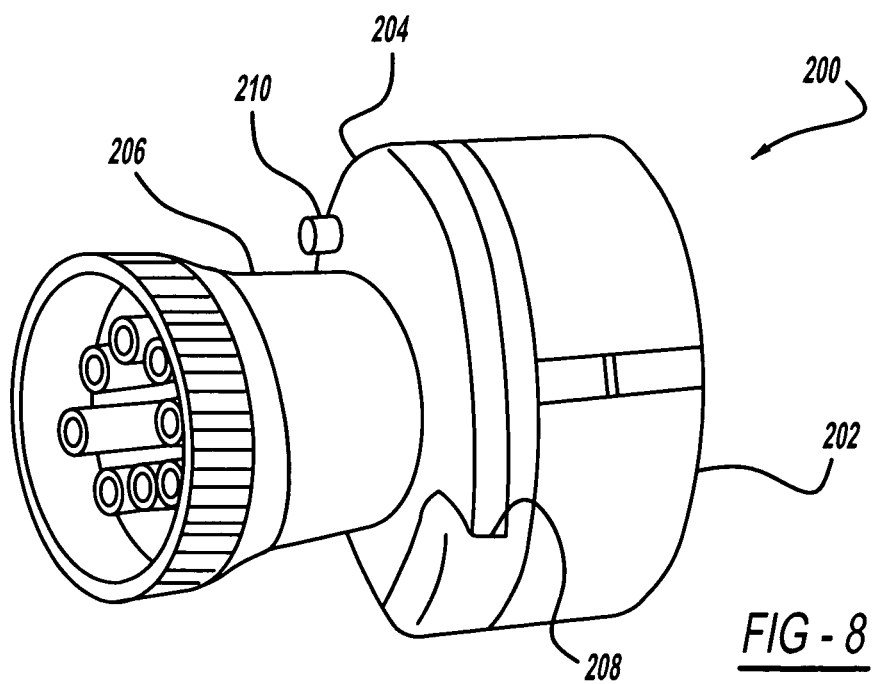
FIG. 8 is a perspective view of a wireless protocol adapter assembly, in accordance with another embodiment of the present invention.

Referring to FIG. 8, in yet another embodiment of a wireless protocol adapter assembly of the present invention, shown generally as 200, the common electronics package 18 is generally cylindrical shaped, and the outer casing 202 is formed with at least one engagement channel 208 or slot adapted for preventing incorrect connection orientation of the common connector plate 204, e.g., formed as a c-channel or u-channel shape to engage a generally circular shaped common connector plate 204 having at least one opposing feature, e.g., a flange and the like, to slidably be received and held within the engagement channel 208. The common connector plate 204 can be held in place by friction and at least one fastening element 210, e.g., a bolt, screw, recessed hexagonal socket hole in an alien bolt, and the like, extending through the common connector plate 204 to the common electronics package 18. It is additionally understood that the engagement channel 208 can be any alternative shape that allows for only correct connection orientation of the common connector plate 204.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wireless protocol adapter assembly for transferring signals between a host computer and a plurality of in-vehicle networks, said wireless protocol adapter assembly comprising:
   a common electronics package for translating and transferring signals between said plurality of in-vehicle networks and said host computer for a plurality of different protocols, said common electronics package having an attachment portion;
   a vehicle connector assembly having a common connector plate operably connectable to said attachment portion for selectively coupling a plurality of vehicle connectors to said common electronics package, said plurality of vehicle connectors operable to selectively access said plurality of in-vehicle networks;
   a wireless adapter board partially disposed within said common electronics package, said wireless adapter board having a plurality of wireless adapters;
   a standard connection pinning arrangement of said wireless adapters; and
   a microcontroller PCB assembly connected to said wireless adapter board by using said standard connection pin arrangement, wherein said microcontroller PCB assembly is selectively mated with said plurality of wireless adapters, through said standard connection pin arrangement and said microcontroller PCB assembly receives and formats signals transmitted between said host computer and said plurality of vehicle networks.

2. The wireless protocol adapter assembly according to claim 1, wherein said common electronics package has an outer casing that is sealed to prevent the ingress of fluid material inside said common electronics package.

3. The wireless protocol adapter assembly according to claim 1, wherein said common electronics package has an outer casing with at least one slot formed in said outer casing that functions as manual reset switch input feature for manually creating a switch input to said common electronics package.

4. The wireless protocol adapter assembly according to claim 1, wherein said plurality of different protocols is selected from the group consisting of an J1708, J1587, J1939, CAN, GM UART, ALDL, J1850 protocol, and combinations thereof.

5. The wireless protocol adapter assembly according to claim 1, wherein said plurality of vehicle connectors is selected from the group consisting of a 9-pin Deutsch, 6-pin Deutsch, 4-pin Haldex, 6-pin GM UART, DMM/TK, and 12-pin ALDL.

6. The wireless protocol adapter assembly according to claim 1, wherein said common connector plate has at least one flange to slidably engage at least one engagement channel of said attachment portion, wherein said at least one engagement channel and flange are adapted to allow said common connector plate to operably couple to said attachment portion in a predetermined orientation.

7. The wireless protocol adapter assembly according to claim 1, wherein said common connector plate has an extension portion that is selectively coupled to said plurality of vehicle connectors to allow the angle of said plurality of vehicle connectors to selectively vary with respect to said common electronics package.

8. The wireless protocol adapter assembly according to claim 1, wherein said common electronics package further comprises a visual indicator panel having at least one LED to visually indicate which of said plurality of different protocols is being used.

9. A wireless protocol adapter assembly for interfacing between a host computer and a plurality of in-vehicle networks, said wireless protocol adapter assembly comprising:
   a common electronics package for translating and transferring signals between said plurality of in-vehicle networks and said host computer for a plurality of different protocols, said common electronics package having an attachment portion;
   a vehicle connector assembly having a common connector plate operably connectable to said attachment portion for selectively coupling a plurality of vehicle connectors to said common electronics package, said plurality of vehicle connectors operable to selectively access said plurality of in-vehicle networks;
   a wireless adapter board partially disposed within said common electronics package, said wireless adapter board having a plurality of wireless adapters;
   a standard connection pinning arrangement of said wireless adapters; and
   a microcontroller PCB assembly connected to said wireless adapter board by using said standard connection pin arrangement, wherein said microcontroller PCB assembly is selectively mated with said plurality of wireless adapters, through said standard connection pin arrangement and said microcontroller PCB assembly receives and formats signals transmitted between said host computer and said plurality of vehicle networks.

10. The wireless protocol adapter assembly according to claim 9, wherein said common electronics package has an outer casing that is sealed to prevent the ingress of fluid material inside said common electronics package.

11. The wireless protocol adapter assembly according to claim 9, wherein said common electronics package has an outer casing with at least one slot formed in said outer casing that functions as manual reset switch input feature for manually creating a switch input to said common electronics package.

12. The wireless protocol adapter assembly according to claim 9, wherein said plurality of different protocols is selected from the group consisting of an J1708, J1587, J1939, CAN, GM UART, ALDL, J1850 protocol, and combinations thereof.

13. The wireless protocol adapter assembly according to claim 9, wherein said plurality of vehicle connectors is selected from the group consisting of a 9-pin Deutsch, 6-pin Deutsch, 4-pin Haldex, 6-pin GM UART, DMM/TK, and 12-pin ALDL.

14. The wireless protocol adapter assembly according to claim 9, wherein said common connector plate has at least one flange to slidably engage at least one engagement channel of said attachment portion, wherein said at least one engagement channel and flange are adapted and configured to allow said common connector plate to operably couple to said attachment portion in a predetermined orientation.

15. The wireless protocol adapter assembly according to claim 9, wherein said common connector plate has an extension portion that is selectively coupled to said plurality of vehicle connectors to allow an angle of said plurality of vehicle connectors to selectively vary with respect to said common electronics package.

16. The wireless protocol adapter assembly according to claim 9, wherein said common electronics package further comprises a visual indicator panel having at least one LED to visually indicate which of said plurality of different protocols is being used.

17. A wireless protocol adapter assembly for interfacing between a host computer and a plurality of in-vehicle networks, said wireless protocol adapter assembly comprising:
a common electronics package for processing and transferring signals between said plurality of in-vehicle networks and said host computer for a plurality of different protocols, said common electronics package having an attachment portion;
a vehicle connector assembly having a common connector plate operably connectable to said attachment portion for selectively coupling a plurality of vehicle connectors to said common electronics package, said plurality of vehicle connectors operable to selectively access said plurality of in-vehicle networks;
a wireless adapter board partially disposed within said common electronics package, said wireless adapter board having a plurality of wireless adapters;
a standard connection pinning arrangement of said wireless adapters;
a microcontroller PCB assembly connected to said wireless adapter board by using said standard connection pin arrangement, wherein said microcontroller PCB assembly is selectively mated with said plurality of wireless adapters, through said standard connection pin arrangement and said microcontroller PCB assembly receives and formats signals transmitted between said host computer and said plurality of vehicle networks;
wherein said wireless protocol adapter assembly recognizes when it is coupled to any of said plurality of in-vehicle network running any of said plurality of different protocols and automatically switches to a protocol;
an outer casing of said common electronics package that is sealed to prevent the ingress of fluid material inside said common electronics package;
at least one slot that is a manual reset switch input feature formed on at least one outside surface of said common electronics package for manually creating a switch input to said common electronics package; and
at least one engagement channel formed in said attachment portion adapted and configured to slidably receive at least one flange formed on said common connector plate, wherein said at least one engagement channel and said at least one flange are adapted to allow said common connector plate to operably couple to said attachment portion in a predetermined orientation.

18. The wireless protocol adapter assembly according to claim 17, wherein said at least one engagement channel has an open end for slidably receiving said at least one flange and a stop formed in said engagement channel to contact an end of said at least one flange to allow said common connector plate to operably couple to said attachment portion in said predetermined orientation.

19. The wireless protocol adapter assembly according to claim 17, wherein said at least one flange is held within said at least one engagement channel by friction and by at least one fastening element extending through a first aperture of said common connector plate into a second aperture of a planar surface of said attachment portion of said common electronics package.

* * * * *